United States Patent [19]

Lindbom

[11] Patent Number: 4,581,517
[45] Date of Patent: Apr. 8, 1986

[54] APPARATUS AND METHOD USED IN PROGRAMMING A COMPUTER FOR MOVING A TOOL THROUGH A THREE DIMENSIONAL SPACE

[76] Inventor: Torsten H. Lindbom, 1849 Kedron Cir., Fort Collins, Colo. 80524

[21] Appl. No.: 696,402

[22] Filed: Jan. 30, 1985

[51] Int. Cl.⁴ .............................................. B23K 9/12
[52] U.S. Cl. .......................... 219/124.34; 219/130.01; 901/42
[58] Field of Search ...................... 219/124.34, 130.01; 901/4, 42; 33/141 R, 142; 318/568, 569

[56] References Cited

U.S. PATENT DOCUMENTS 4,014,495 3/1977 Oda et al. ................................ 901/42
4,224,501 9/1980 Lindbom et al. ........................ 901/4

FOREIGN PATENT DOCUMENTS 3025950 2/1982 Fed. Rep. of Germany .... 33/141 R
56-36385 4/1981 Japan ............................... 219/130.01

Primary Examiner—Clifford C. Shaw
Attorney, Agent, or Firm—Sheridan, Ross & McIntosh

[57] ABSTRACT

A teaching device is provided for use in teaching a computer a program for moving a tool through a three dimensional space and along a predetermined path having a socket at one end for attachment to the tool and at its other end a cavity in which a ball is seated so that the ball may contact and be moved over means defining the predetermined path. Preferably, the teaching device forms a part of an electric circuit used in protecting the teaching device from destruction or other damage.

17 Claims, 4 Drawing Figures

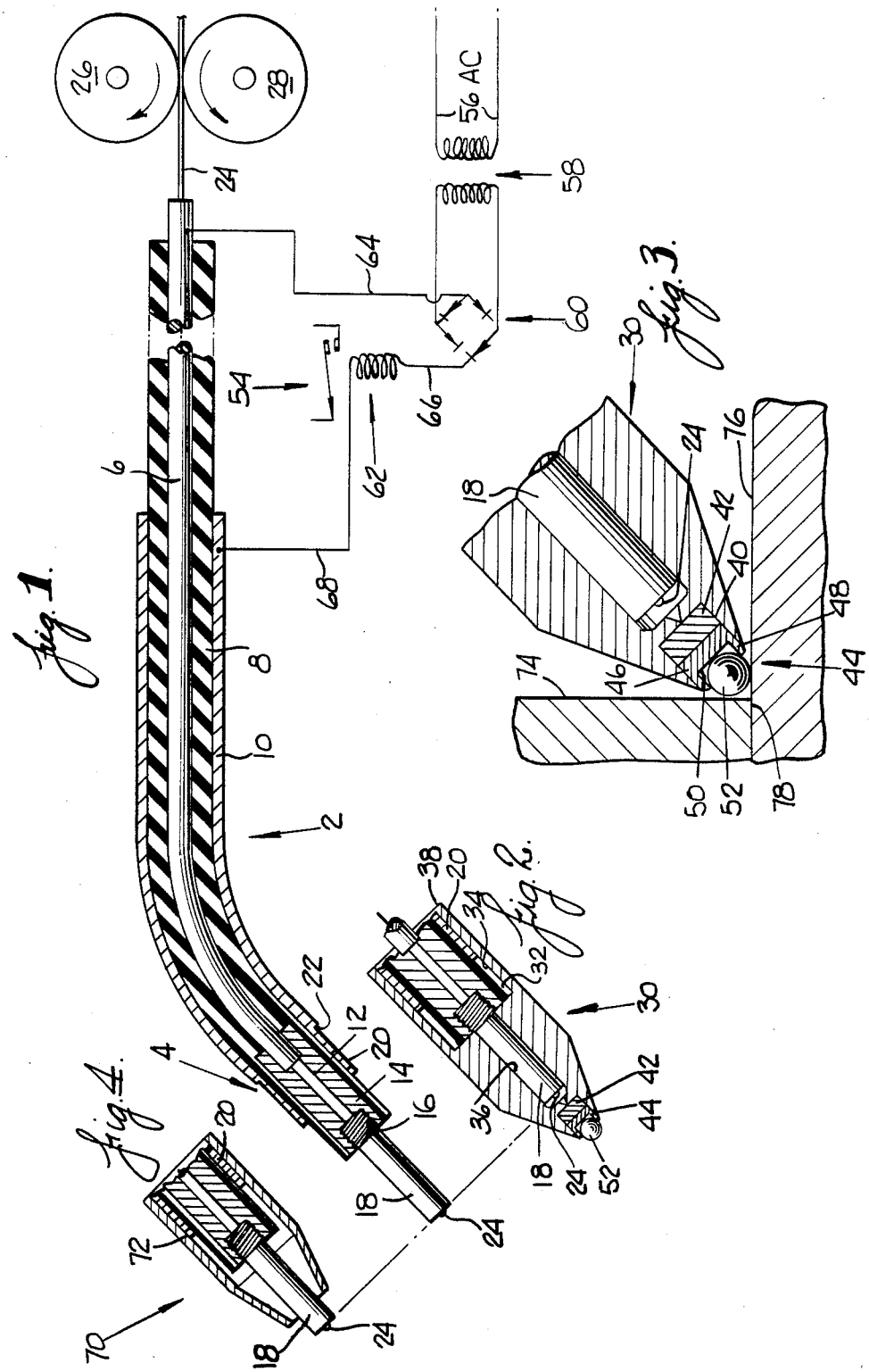

APPARATUS AND METHOD USED IN PROGRAMMING A COMPUTER FOR MOVING A TOOL THROUGH A THREE DIMENSIONAL SPACE

FIELD OF THE INVENTION

This invention relates to the field of moving a tool through a three dimensional space to perform work at various locations in the three dimensional space and more particularly to a teaching device used with the tool to program a computer so that the computer will move the tool through the three dimensional space, along a predetermined path and with a desired relative relationship to the work.

BACKGROUND OF THE INVENTION

In order to move a tool through a three dimensional space and along a predetermined path to do work continuously or at certain locations, it is necessary to program a computer. In prior art practices, this has been accomplished by moving the tool along the surface of the path through which the tool is to be moved while feeding programming information to the computer. One problem associated with this method is that the tool may strike obstacles in the path causing undesirable changes in the angular relationship of the tool to the surface so that the tool would not perform its work properly at such locations. Also, the tool could be damaged. It has been proposed to secure a teaching device to the tool so as to protect the tool while being moved along the path and in contact with the surface. Such a device, while protecting the tool, still suffered the drawback of inadvertantly changing the angular relationship of the tool or even moving it too far out of the intended path if an obstacle was encountered. Also, the structure of the teaching device sometimes prevented the positioning of the tool at the desired angular relationship.

SUMMARY OF THE INVENTION

The present invention provides apparatus and method for use in teaching a computer a program for moving a tool through a three dimensional space, along a predetermined path and with a desired relative relationship to the work. In accordance with the invention, a teaching device is secured to the tool and is moved into contact with means defining the predetermined path. The teaching device is provided with means for permitting substantially friction-free movement of the teaching device over the means defining the predetermined path while in contact therewith so that if any obstacles are encountered the teaching device will move over such obstacles with little or no tendency for the angular relationship of the tool to be changed. Also, the friction-free movement puts less of a strain on the programmer so that the program can be completed more rapidly.

In the preferred embodiment of the invention, a teaching device is provided wherein one end of the teaching device has a socket for receiving the end of the tool. The other end of the teaching device is provided with a cavity in which cavity there is seated a steel ball. The cavity has a cylindrical surface having a diameter less than the diameter of the ball and a length less than half the diameter of the ball so that the major portion of the ball is outside of the cavity. A magnet is located adjacent to the cavity so as to hold the ball in the cavity but permit rotation of the ball in the cavity. In order to keep friction at a minimum, the surfaces defining the cavity are formed from a smooth hard material such as teflon. Additionally, the preferred embodiment includes an electric circuit operatively associated with the tool and teaching device for preventing damage to the teaching device when the tool and teaching device are connected together. The circuit itself includes a portion of the teaching device and the circuit is used to control the state or position of a switch electrically connected to a source of power used in heating a welding wire provided with the tool.

It is an object of this invention to provide apparatus and method for use in teaching a computer a program for moving a tool through a three dimensional space and along a predetermined path so that the desired movement of the tool is more accurately programmed.

It is another object of this invention to provide apparatus and method for use in teaching a computer a program for moving a tool through a three dimensional space, along a predetermined path and with a desired relative relationship to the work so that the computer may be more rapidly programmed.

It is a further object of this invention to provide apparatus and method for moving a tool through a three dimensional space and along a predetermined path so that the desired space and angular relationships of the tool to the surface where the work is to be performed is maintained.

It is also an object of this invention to provide a teaching device characterized by use of a magnet for holding a ball in place.

It is yet another object of the present invention to provide an electric circuit used in preventing damage to the tool and the teaching device. This circuit can also be used in detecting the build up of slag during operation of the tool.

Other features and advantages of the invention will be apparent from the following more particular description of preferred embodiments as illustrated in the accompanying drawing in which like reference characters refer to the same parts through the various views. The drawing is not necessarily to scale, emphasis instead being placed upon illustrating the principles of the invention.

BRIEF DESCRIPTION OF THE DRAWING

FIG. 1 is a schematic illustration of a tool capable of use in this invention and an electric circuit associated with this invention;

FIG. 2 is a schematic illustration of a teaching device of this invention positioned on the tool;

FIG. 3 is a schematic illustration of the teaching device of FIG. 2 in an operating position; and FIG. 4 is a schematic illustration of a gas shield positioned on the tool.

DETAILED DESCRIPTION OF THE PREFERRED EMBODIMENT

In FIG. 1, there is a schematic illustration of a welding torch 2 that is moved through a three dimensional space, along a predetermined path and with a desired relative relationship to the work in order to perform work by suitable mechanisms (not shown). Such a tool may be part of a robot used in welding. In such a welding robot, the end portion 4 of the torch 2 is mounted in a holder (not shown). The welding torch 2 comprises an electrode 6 covered by a layer of insulating material 8 and encased within a flexible metallic sheath 10. The end 12 of the electrode 6 is connected to an insulated socket 14 having a threaded electrical connection 16. An electrode tip 18 is in threaded engagement with the electrical connection 16. The thickness of the metallic sheath 10 is reduced adjacent to the end portion 20 so as to form an annular shoulder 22 for a purpose described below. Welding wire 24 is pushed through the electrode 6 and the electrode tip 18 by a cooperating pair of feed wheels 26 and 28.

A teaching device 30 is illustrated in FIG. 2 and comprises at one end a hollow end portion 32 defined by a cylindrical wall 34. The inner diameter of the wall 34 is slightly larger than the outer diameter of the end portion 20. The hollow end portion 32 is in communication with a cylindrical cavity 36 that has an inner diameter slightly greater than the outer diameter of the electrode tip 18. As illustrated in FIG. 2, the teaching device 30 has been moved over the welding torch 2 so that the electrode tip 18 is in the cavity 36 and in contact therewith and the end portion 20 is in contact with the inner surface of the wall 34. The teaching device 30 is in the desired position when the end 38 of the wall 34 is in abutting relationship with the annular shoulder 22. It is understood that configurations other than cylindrical may be used so long as the corresponding parts are compatible.

At the other end, the teaching device 30 has a cylindrical cavity 40 as illustrated in FIG. 3. Mounted in the innermost portion of the cavity 40 is a magnet 42. Also mounted in the cavity 40 is a cup 44 having a base 46 and a cylindrical wall forming a cylindrical cavity 50. The base 46 is in contact with the magnet 42. A ball 52 is seated in the cavity 50. The ball 52 is formed from a magnetic material so that the magnet 42 functions to pull the ball into the cavity until it is in contact with the base 46. As illustrated in FIG. 3, the inner diameter of the wall 48 is less than the outer diameter of the ball 52 and the length of the cavity 50 is less than half the outer diameter of the ball 52 so that the major portion of the ball 52 is located outside the cavity 50. In the preferred embodiment, the cavity is cylindrical and the relative dimensions of the cavity and the ball are chosen so that the ball 52 is in contact with the base 46 and the wall 48. However, it is to be understood that other geometrical configurations may be used. The cup 44 could be formed with a triangularly shaped base 46 and side walls 48 with the resulting cavity 50 shaped to stop longitudinal movement of the ball 52 into the cavity 50 and to prevent relative movement between the ball 52 and walls 48. In this construction, there would be only four points of contact between the ball 52 and the cup 44.

In addition to the teaching or programming feature associated with the present invention, the preferred embodiment also includes an electric circuit used in controlling power to the welding torch 2. This circuit protects the teaching device 30 and the welding torch 2 from damage or destruction that could occur, for example, if the teaching device 30 was inadvertently left on the welding torch 2 and the welding robot was activated for the purpose of providing desired welding. The electric circuit is used in controlling the state of a switch 54 that is electrically connected between the computer, or other controller that controls the operation of the welding robot, and a source of DC power. When the switch 54 is in an open position, welding electrical current will be supplied to the electrode 6 but when the switch 54 is in its closed position, welding electrical current is not applied to the electrode 6. The electric circuit used in opening and closing the switch 54 includes a source of AC power 56, a transformer 58, a rectifier 60 and a relay 62. One side of the rectifier 60 is connected by line 64 to the electrode 6 while the other side of the rectifier 60 is connected to one side of the relay 62 by line 66. The other side of the relay is connected to the metal sheath 10 by line 68. When the teaching device is not on the welding torch 2, the switch 54 is open and the DC power is applied to the electrode 6 permitting welding electrical current to be applied to the electrode 6 causing the welding wire 24 to be heated for welding.

When the teaching device 30 is positioned on the welding torch 2, contact is made between the electrode tip 18 and the walls of the cavity 36, and contact is also made between the end portion 20 of the metal sheath 10 and the inner surface of the wall 34 so that the lines 64 and 68 are connected together causing current to flow through the circuit and activate the relay 62 to close the switch 54. In the case of the switch 54 being closed, the DC power is effectively short circuited so that no damaging electrical power is applied to the welding torch 2 and the teaching device 30 while the teaching device is connected to the welding torch 2.

The circuit illustrated in FIG. 1 is also useful when the welding robot is in operation. In FIG. 4, the structure of the welding torch 2 when in operation is illustrated. A gas shield 70 comprising a hollow cylinder 72 has been positioned with the inner surface of the hollow cylinder 72 in contact with the end portion 20 of the metallic sheath 10. An annular space exists between the electrode tip 18 and the inner surface of the hollow cylinder 72 so that in normal operation the switch 54 is in the open position. During the operation of the welding robot, there sometimes occurs a build-up of slag on the inner surface of the hollow cylinder 72. If the build-up of slag becomes excessive to the point that electric current can flow between the slag and the electrode tip 18, the circuit in FIG. 1 would be completed and the relay 62 would be activated to close the switch 54 and cut off the welding electric current to the electrode 6.

The operation of the preferred embodiment of the invention is illustrated in FIG. 3 wherein the teaching device 30 has been moved into position on the end of the welding torch. In the illustration in FIG. 3, the means defining the predetermined path comprises a piece of metal 74 which has been positioned in contact with another piece of metal 76 and it is desired to weld the pieces 74 and 76 together along the path defined by the juncture 78 of the pieces 74 and 76. The teaching device 30 has been moved into contact with the pieces of metal 74 and 76 so that there is contact between the ball 52 and the pieces of metal 74 and 76 at only two points. In a normal welding operation, it is desirable to change both the lead or drag angle and the weld angle and to position the electrode at the proper distance from the work. This means that to properly program the computer, it must be possible to pivot the teaching device about a point in any direction. Since the major portion of the ball 52 in this invention projects outwardly from the cavity 50, it is possible to pivot the teaching device 30 in any direction so as to change the lead or drag angle and the weld angle. Since only point contact is established between the ball 52 and the pieces of metal 74 and 76, the movement of the ball 52 over the surfaces of the pieces of metal is substantially friction-free. Also, the teaching device is designed to space the electrode tip 18 at the proper distance from the work.

In the preferred embodiment of the invention, the ball 52 is a common steel ball bearing ball and the cup 54 is formed from teflon or other similar material.

While the preferred embodiments of the invention have been illustrated and described herein, it may be otherwise embodied and practiced within the scope of the following claims.

What is claimed is:

1. Apparatus for use in teaching a computer a program for moving a tool through a three dimensional space along and in a desired angular orientation relative to a predetermined path comprising:
   a teaching device;
   means for securing a first end of said teaching device to one end of said tool;
   means defining said predetermined path; and
   a ball bearing rotatably mounted on a second end of said teaching device for contacting and rolling over said means defining said predetermined path during movement of said tool and said teaching device secured thereto along and in said desired angular orientation relative to said predetermined path, wherein said tool is pivotable in two dimensions about contacting portions of said ball bearing and said means defining said predetermined path during said movement whereby said desired angular orientation is achieved.

2. Apparatus as in claim 1 further comprising:
   means for mounting said ball bearing on said second end of said teaching device.

3. Apparatus as in claim 2 wherein said mounting means comprises:
   a cavity in said second end of said teaching device for receiving said ball bearing.

4. Apparatus as in claim 3 wherein:
   the length of said cavity is less than half the diameter of said ball bearing; and
   more than one-half of said ball bearing is outside of said cavity when said ball bearing is received by said cavity.

5. Apparatus as in claim 3 wherein:
   the cross-sectional area of said cavity is less than the greatest cross-sectional area of said ball bearing; and
   more than one-half of said ball bearing is outside of said cavity when said ball bearing is received by said cavity.

6. Apparatus as in claim 3 wherein:
   said cavity is cylindrical;
   the diameter of said cylindrical cavity is less than the diameter of said ball bearing; and
   the length of said cavity is less than half the diameter of said ball bearing; and
   more than one-half of said ball bearing is outside of said cavity when said ball is received by said cavity.

7. Apparatus as in claim 3 wherein:
   the surface defining said cavity comprises a substantially frictionless material.

8. Apparatus as in claim 7 wherein:
   the surface defining said cavity is teflon.

9. Apparatus as in claim 2 wherein said mounting means comprises:
   a magnet.

10. Apparatus as in claim 1 wherein said tool comprises:
    a welding torch.

11. Apparatus as in claim 10 and further comprising:
    electronic means for preventing operation of said welding torch when said teaching device is secured to said welding torch.

12. A method for use in teaching a computer a program for moving a tool through a three dimensional space along and in a desired angular orientation relative to a predetermined path comprising:
    providing a teaching device;
    securing a first end of said teaching device to one end of said tool;
    providing means defining said predetermined path;
    rotatably mounting a ball bearing on a second end of said teaching device; and
    contacting said ball bearing with, and rolling said ball bearing over said means defining said predetermined path during movement of said tool and teaching device secured thereto along and in said desired angular orientation relative to said predetermined path, wherein said tool is pivotable in two dimensions about contacting portions of said ball bearing and said means defining said predetermined path during said movement whereby said desired angular orientation is achieved.

13. A method as in claim 12 wherein said rolling of said ball bearing over said means defining said predetermined path during said movement is substantially friction-free.

14. A method as in claim 12 wherein said mounting of said ball bearing comprises:
    providing a cavity in said second end of said teaching device; and
    holding a minor portion of said ball bearing in said cavity while permitting rotation of said ball bearing.

15. A method as in claim 12 wherein said mounting of said ball bearing comprises:
    providing a cavity in said second end of said teaching device; and
    magnetically holding a portion of said ball bearing in said cavity while permitting rotation of said ball bearing.

16. A method as in claim 15 and further comprising:
    providing said cavity with a surface formed from a substantially frictionless material.

17. A method as in claim 15 and further comprising:
    providing said cavity with a teflon surface.

* * * * *

UNITED STATES PATENT AND TRADEMARK OFFICE
CERTIFICATE OF CORRECTION

PATENT NO. : 4,581,517
DATED : April 8, 1986
INVENTOR(S) : Torsten H. Lindbom

It is certified that error appears in the above—identified patent and that said Letters Patent is hereby corrected as shown below:

At column 3, line 33, insert --48-- after the word wall; line 51, delete "prevent" and substitute therefor --permit--.

At column 6, line 57, delete "15" and substitute therefor --16--.

Signed and Sealed this

First Day of July 1986

[SEAL]

Attest:

DONALD J. QUIGG

Attesting Officer

Commissioner of Patents and Trademarks